3,535,138
**METHOD OF APPLYING A LUMINESCENT
LAYER TO A GLASS SUPPORT**
Willem Lambertus Wanmaker, Johannes Wilhelmus
Maria Arents, and Marinus Gerardus Antoine Tak,
Emmasingel, Eindhoven, Netherlands, assignors, by
mesne assignments, to U.S. Philips Corporation, New
York, N.Y., a corporation of Delaware
No Drawing. Filed July 24, 1967, Ser. No. 655,294
Claims priority, application Netherlands, July 28, 1966,
6610613
Int. Cl. H01j 61/35
U.S. Cl. 117—33.5                          4 Claims

ABSTRACT OF THE DISCLOSURE

The adhesion of a luminescent layer to a glass support is improved by the treatment of the glass support with a solution of an alkali metal salt, drying the support and then applying a suspension of the luminescent material containing a low melting point borate or phosphate. This abstract is not intended to be a description of the invention defined by the claims.

---

The invention in this case relates to an improved method of applying a luminescent screen to a glass support.

In the manufacture of luminescent screens in such devices as cathode-ray tubes, high pressure or low pressure mercury vapor discharge lamps, it is important that the luminescent layer, formed of luminescent grains be homogeneous and adhere satisfactorily to a glass support.

Several different methods of applying the luminescent layer to the glass support have been employed. In the methods most used, a suspension of the luminescent grains in a non-equeous liquid suspending agent is brought into contact with the glass support and after a period of time most of the liquid suspension is removed from the glass support leaving a thin film of the luminescent liquid suspension adhering to the glass support.

The suspension of the luminescent grains may be applied to a cathode ray tube by pouring the suspension into the tube supported on a horizontal support and then decanting the suspension from the tube after a fixed period of time or the suspension may be sprayed onto the cathode ray tube.

In another method used for low-pressure mercury vapor discharge lamps in which the glass support is formed by an elongated tube, the glass tube is arranged vertically above the outlet opening of a supply vessel containing the suspension, which suspension is forced upwards into the tube to the desired level after which the suspension is allowed to flow back into the supply vessel leaving a thin layer of the suspension clinging to the wall of the tube in which layer the luminescent grains adhere to the glass support and to each other. This adhesion is effected by an adhesive provided in the suspension. This adhesive may be nitrocellulose or another high-polymer organic compound, for example, a polymeric compound which easily depolymerises under the action of heat. Such depolymerizable compounds are, for example, acrylates and polyethylene oxides, known under the trade name of "Polyox."

The luminescent screens are dried, after the thin layer of the suspension is applied and then subjected to a thermal treatment. During this heat treatment the adhesive decomposes. If it is of organic nature, as is usually the case, the residues, for example, carbon, are removed by combustion. A most complete removal of the temporary adhesive is necessary to avoid the risk of decomposition of residual adhesive during the use of the device, as such residues would act as a filter to reduce the emitted luminescent radiation.

The adhesion after the removal of the temporary adhesive is a complicated phenomenon, which cannot yet be fully accounted for. Presumably the Van der Waals forces of attraction play an important role. Also the nature of the substrate is, of course, important.

Since in some cases, particularly when using coarse luminescent grains, which usually provide a higher light output, the adhesion has been found to be insufficient after the removal of the temporary adhesive, it has been proposed to improve the adhesion by adding, apart from the temporary adhesive, a substance to the suspension, which substance is left after the removal of the temporary adhesive and serves as a binder. For this purpose, for example, low melting point borates and phosphates of various elements are particularly suitable. Very good results are obtained, for example, by means of calcium strontium borate, magnesium barium borate, barium tetraphosphate, zinc barium magnesium borate and zinc strontium calcium borate. Particularly the two last-mentioned substances provide an excellent adhesion. The substances are usually added to the suspension in a quantity from 0.1 to 2% by weight, calculated on the weight of the luminescent material. The borates and phosphates and particularly the two last-mentioned substances have the further advantage of absorbing little visible radiation.

Although the combination of a temporary adhesive, for example, nitrocellulose, and a low melting point borate or phosphate results in homogeneous luminescent layers, it has been found that, the resultant adhesion was insufficient in many devices, particularly low-pressure mercury vapor discharge lamps in which the luminescent layers were applied to a glass support.

It was found that the adhesion could be improved by using a greater quantity of binder, but this involves a drop of light output, since binder is then found at many places instead of luminescent material. Moreover, after some time the light output often drops more strongly than with the use of a smaller quantity of binder.

According to the method of the invention a luminescent layer is applied to a glass support from a suspension of luminescent grains, a temporary adhesive to be removed by heating and a quantity of a low melting point borate or phosphate in a liquid, non-aqueous suspension agent, only after the glass support is wetted with a diluted aqueous solution of at least one water-soluble salt of an alkali metal such as sodium, lithium or potassium and dried.

By wetting with a solution of an alkali metal salt and subsequent drying a thin layer of the alkali metal salt is left on the glass support. This layer provided an improvement of the adhesion, even if no borate or phosphate is used as a binder. In such a case, however, the light output decreases to an inadmissible value after only a very short time. If, however, both the steps of wetting the glass support with an alkali metal salt solution and a phosphate or a borate is used as a binder, the reduction of light output during operation is drastically restricted and a significant improvement in adhesion is obtained.

The quantity of the alkali metal salt in the water for wetting the glass support may be small; this quantity is preferably 0.1 to 2% by weight. A quantity of less than 0.1% by weight does not provide satisfactory results; more than 2% by weight is not necessary, since this does not provide a further improvement in adhesion and, moreover, in general, the reduction of light output after a certain number of operational hours becomes greater.

Very good results may be obtained with the use of alkali metal carbonates, particularly, sodium carbonate. The latter substance has the advantage that it is very cheap, satisfactorily soluble in water and provides a very homogeneous layer after drying. However, other water soluble alkali metal salts such as potassium carbonate and sodium, potassium and lithium chlorides, chlorates, nitrates and sulfates may also be employed.

The invention may be carried out both with a temporary adhesive such as a cellulose binder which has to be fired at high temperatures (about 600° C.) for example nitrocellulose, cellulose acetate or cellulose butyrate and with temporary adhesives which can be removed at lower temperatures (about 450° C.) for example the aforesaid binder known under the trade name of "Polyox."

When the temporary adhesives having the high firing temperature are used, a hard glass support may be employed without any objection in practicing the invention. The adhesion also to a hard glass support is then largely sufficient.

If firing has to be carried out at a low temperature, either because the luminescent materials are sensitive to oxidation, for example, phosphates activated with copper and/or tin or because it is desired to use very soft glass, a temporary adhesive may be used, which has a low firing temperature without the risk of insufficient adhesion, which is often the case when flushing with the alkali metal salt solution is not employed.

Although a certain improvement in adhesion may also be obtained by adding an alkali metal salt, for example, soda, to the suspension. This method has proved not to be useful, since a strong reduction in light output is involved during the lifetime of the lamp or tube, i.e. the lumen maintenance is bad. Therefore, a non-aqueous suspension medium has to be used, in which the alkali metal salt is not dissolved.

In the experiments to be described hereinafter various borates or phosphates were employed. These substances may be produced by heating a mixture of different compounds at a temperature between 700° C. and 850° C. for a given time, usually about one hour. A few compositions of the starting mixtures employed are:

(1) 18.3 g. of ZnO+38.4 g. of BaCO+37.1 g. of $H_3BO_3$;
(2) 12.2 g. of ZnO+22.1 g. of SrCO+15.0 g. of $CaCO_3$+37.1 g. of $H_3BO_3$;
(3) 18.3 g. of ZnO+4.5 g. of MgO+19.2 g. of BaCO+73.1 g. of $H_3BO_3$:
(4) 70.0 g. of $BaHPO_4$+13.1 g. of $(NH_4)_2HPO_4$.

The results of the experiments to be described hereinafter did not show a difference in adhesion and lumen maintenance when the borates or phosphates obtained from the aforesaid mixtures were used.

For a comparison of the adhesion and the lumen maintenance as a function of the percentages of phosphate or borate binder and the quantity of alkali metal compound employed to wet the support, various tests were made, the results of which are indicated in the following table. The temporary adhesive in these tests was nitrocellulose, dissolved in butylacetate. The glass supports in these experiments were glass tubes of normal glass, from which low-pressure mercury vapor discharge lamps were made. Prior to coating with the suspension the glass tubes were flushed on the inner side with an aqueous solution of sodium carbonate in the percentage indicated in the table and then dried in air. The temporary adhesive was invariably fired at a temperature of about 550° C. the luminescent material employed was a calciumhalophosphate activated with antimony and manganese and emitting light of a so-called cool-white color.

TABLE

| Exp. No. | Binder, percent | Soda, percent | Adhesion | Lumen/w. at 0 hours | Lumen/w. at 100 hours |
|---|---|---|---|---|---|
| 1 | 0 | 0 | 40 | 79.0 | 77.6 |
| 2 | 0 | ½ | 125 | 77.6 | 65.6 |
| 3 | 0 | 1 | 135 | 76.3 | 59.4 |
| 4 | ½ | 0 | 150 | 78.0 | 77.0 |
| 5 | ½ | ½ | >300 | 77.8 | 76.4 |
| 6 | ½ | 1 | >300 | 75.1 | 68.4 |
| 7 | 1 | 0 | 182 | 77.1 | 76.0 |
| 8 | 1 | ½ | >300 | 76.2 | 74.8 |
| 9 | 5 | 1 | >300 | 75.5 | 68.7 |

The adhesion was determined by directing a thin water jet to the luminescent layer in the fired glass tube, the pressure of the jet being gradually raised until a small distinct hole was formed in the luminescent layer. The numbers in the column "Adhesion" indicate the pressure. Pressures exceeding 300 could not be measured by the available apparatus. An adhesion in excess of 300 is largely sufficient for practical purposes.

Practically the same values were found, when a solution of potassium carbonate was used for flushing; lithium carbonate resulted in a slightly minor adhesion, but the lumen maintenance in percent was substantially the same.

While we have described our invention in connection with specific embodiments and applications, other modifications thereof will be readily apparent to those skilled in this art without departing from the spirit and scope of the invention as defined in the appended claims.

What we claim is:

1. A method of applying a luminescent layer to a glass support said method comprising the steps, wetting a glass support with a dilute aqueous solution of at least one water-soluble salt of an alkali metal, in the amount of 0.1 to 2% by weight, drying said support and then bringing said support into contact with a suspension, in a liquid non-aqueous suspension agent, of a granular luminescent material, a temporary adhesive capable of being removed by heating and selected from the group consisting of cellulose binders and heat depolymerizable organic polymers and as a permanent binder a low-melting point inorganic compound selected from the group consisting of low melting point zinc borates and phosphates.

2. The method of claim 1 wherein the water-soluble salt of an alkali metal is an alkali metal carbonate.

3. The method of claim 2 wherein the alkali metal carbonate is sodium carbonate.

4. The method of claim 1 wherein the temporary adhesive is a heat depolymerizable organic polymer.

References Cited
UNITED STATES PATENTS

| | | | |
|---|---|---|---|
| 3,316,109 | 4/1967 | Rimbach | 117—33.5 XR |
| 3,424,605 | 1/1969 | Beaumont et al. | 117—33.5 |
| 3,424,606 | 1/1969 | Giudici | 117—33.5 |
| 3,435,271 | 3/1969 | Vodoklys | 117—33.5 XR |

ALFRED L. LEAVITT, Primary Examiner

W. F. CYRON, Assistant Examiner

PO-1050
(5/69)

UNITED STATES PATENT OFFICE
CERTIFICATE OF CORRECTION

Patent No. 3,535,138          Dated  October 20, 1970

Inventor(s)  WILLEM LAMBERTUS WANMAKER ET AL          (PHN 1739)

It is certified that error appears in the above-identified patent and that said Letters Patent are hereby corrected as shown below:

Column 4, last line in the table under "Binder, percent", "5" should read -- 1 --.

Signed and sealed this 2nd day of Nov. 1971.

(SEAL)
Attest:

EDWARD M. FLETCHER, JR.          ROBERT GOTTSCHALK
Attesting Officer                Acting Commissioner of Patents